US011867875B2

(12) United States Patent
Gotanda et al.

(10) Patent No.: US 11,867,875 B2
(45) Date of Patent: Jan. 9, 2024

(54) MONOMER COMPOSITION FOR CONTACT LENSES, POLYMER FOR CONTACT LENSES, CONTACT LENS, AND METHOD OF PRODUCING THE CONTACT LENS

(71) Applicant: NOF CORPORATION, Tokyo (JP)

(72) Inventors: Ryuya Gotanda, Kawasaki (JP); Koh Kobayashi, Kawasaki (JP); Shu Takashima, Kawasaki (JP); Norio Iwakiri, Kawasaki (JP); Yosuke Matsuoka, Kawasaki (JP); Eiji Harata, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 392 days.

(21) Appl. No.: 17/275,799

(22) PCT Filed: Sep. 10, 2019

(86) PCT No.: PCT/JP2019/035531
§ 371 (c)(1),
(2) Date: Mar. 12, 2021

(87) PCT Pub. No.: WO2020/066598
PCT Pub. Date: Apr. 2, 2020

(65) Prior Publication Data
US 2022/0035076 A1 Feb. 3, 2022

(30) Foreign Application Priority Data
Sep. 25, 2018 (JP) ................. 2018-179067

(51) Int. Cl.
*C08F 230/08* (2006.01)
*G02B 1/04* (2006.01)
*G02C 7/04* (2006.01)

(52) U.S. Cl.
CPC ............ *G02B 1/043* (2013.01); *C08F 230/08* (2013.01); *G02C 7/049* (2013.01)

(58) Field of Classification Search
CPC combination set(s) only.
See application file for complete search history.

(56) References Cited

U.S. PATENT DOCUMENTS

| 2011/0319583 A1* | 12/2011 | Matsuoka | ............ | C08F 230/08 |
| | | | | 526/263 |
| 2018/0314077 A1* | 11/2018 | Sakurai | ................. | G02C 7/04 |

FOREIGN PATENT DOCUMENTS

| CN | 102348726 A | 2/2012 | | |
| CN | 110199219 A | 9/2019 | | |
| EP | 2407493 A1 * | 1/2012 | ............ | A61L 27/18 |
| EP | 2407493 A1 | 1/2012 | | |
| EP | 3778713 A1 | 2/2021 | | |
| JP | 2007-197513 A | 8/2007 | | |
| TW | 201718768 A | 6/2017 | | |
| TW | 201827892 A | 8/2018 | | |
| WO | 2008/061992 A2 | 5/2008 | | |
| WO | 2010/104000 A1 | 9/2010 | | |
| WO | 2017/073739 A1 | 5/2017 | | |
| WO | 2018/135421 A1 | 7/2018 | | |
| WO | WO-2018135421 A1 * | 7/2018 | ............ | C08F 230/02 |
| WO | 2019/194264 A1 | 10/2019 | | |

OTHER PUBLICATIONS

International search report for PCT/JP2019/035531 dated Dec. 3, 2019.

* cited by examiner

*Primary Examiner* — Peter A Salamon
(74) *Attorney, Agent, or Firm* — Sughrue Mion, PLLC

(57) ABSTRACT

Provided is a contact lens that can exhibit excellent breaking elongation and surface hydrophilicity even when produced using a hydrophobic mold made of polypropylene or the like without performing a surface hydrophilic treatment. Further provided are a monomer composition and a polymer that can be suitably used for obtaining the contact lens. This monomer composition contains (A) a siloxanyl group-containing itaconic acid diester monomer, (B) an amide group-containing monomer, (C) a hydroxy group-containing monomer, (D) a siloxanyl group-containing (meth)acrylate, and (E) a cross-linking agent in a specific ratio.

16 Claims, No Drawings

MONOMER COMPOSITION FOR CONTACT LENSES, POLYMER FOR CONTACT LENSES, CONTACT LENS, AND METHOD OF PRODUCING THE CONTACT LENS

CROSS REFERENCE TO RELATED APPLICATIONS

This is a U.S. National Phase Application under 35 U.S.C. § 371 of International Patent Application No. PCT/JP2019/035531, filed Sep. 10, 2019, which claims priority of Japanese Patent Application No. 2018-179067, filed Sep. 25, 2018. The entire contents of which are hereby incorporated by reference.

TECHNICAL FIELD

The present invention relates to a monomer composition for contact lenses, a polymer of the composition, a contact lens consisting of a hydrate of the polymer, and a method of producing the contact lens.

BACKGROUND ART

Silicone hydrogel contact lenses are recognized as safer lenses that supply more oxygen to a cornea of an eye than conventional hydrogel contact lenses containing no silicone.

Generally, soft contact lenses are produced by a cast molding method, and in this method, a polypropylene mold is often used. When silicone hydrogel contact lenses are produced by this method, since polypropylene is hydrophobic, silicone monomer is polymerized in a state of orienting in a mold surface. Thus, a silicone portion is formed on a lens surface, and hydrophilicity of the surface becomes low. If the hydrophilicity of the lens surface is not sufficient, lipids, proteins, and the like may adhere to the lens surface, causing white turbidity of the lens and eye diseases.

Therefore, it has been proposed to prepare a silicone hydrogel contact lens and then form a coating using plasma gas or a hydrophilic polymer or a surface graft polymer using a hydrophilic monomer on the lens surface. However, these surface treatments require many devices and complicate a process, which is not desirable in mass production.

A method is known in which a hydrophilic polymer wetting agent such as polyvinylpyrrolidone (PVP) is added to a monomer composition and the composition is polymerized to obtain a silicone hydrogel contact lens. In this method, since a polymer contains the wetting agent, sufficient hydrophilicity can be obtained without performing the above surface treatment. However, since the wetting agent is not crosslinked with the polymer, there is a concern that the wetting agent may be eluted from the lens during an alcohol extraction step after the polymerization or a lens wearing period and the hydrophilicity of a lens surface may be lowered to deteriorate the wearing feeling.

A method is known in which a mold having a higher hydrophilicity than a polypropylene mold is used, and a silicone monomer is polymerized in a state where it is difficult to orient in the lens surface to produce a contact lens. However, the material used for such a mold has a higher melting point than polypropylene, and there is a problem in processability at the time of mold formation.

Under such circumstances, for the purpose of improving hydrophobicity of a surface of a soft contact lens using a silicone-containing copolymer, there has been proposed a method using a hydrophilic monomer, such as N, N-dimethylacrylamide (DMAA), N-vinyl-2-pyrrolidone (NVP), N-methyl-N-vinylacetamide (MVA) or N-vinylpyrrolidinone, in a monomer composition. However, even if such a hydrophilic monomer is used, the hydrophilicity of the lens surface cannot be said to be sufficient.

Patent Literature 1 discloses a contact lens obtained from a composition containing 3-methacryloyloxypropyltris (trimethylsiloxy) silane (TRIS) as a silicone monomer and further containing NVP as a vinyl monomer. Since this contact lens contains TRIS, the contact lens is hard and uncomfortable to wear.

Patent Literature 2 discloses a composition containing a phosphorylcholine group-containing (meth)acrylic ester monomer, a (meth)acrylic ester silicone monomer having a hydroxyl group, and silicone (meth)acrylate, and describes that a polymer of the composition can be used for contact lenses.

Patent Literatures 3 and 4 disclose a composition containing a siloxanyl group-containing itaconic acid diester monomer having a primary hydroxyl group and 2-methacryloyloxyethyl phosphorylcholine (MPC), and describe that a polymer of the composition can be used for contact lenses. In Patent Literatures 3 and 4, good results are obtained in terms of hydrophilicity and oxygen permeability of the lens surface.

CITATION LIST

Patent Literature

Patent Literature 1: WO 2008/061992 A1
Patent Literature 2: JP-A 2007-197513
Patent Literature 3: WO 2010/104000 A1
Patent Literature 4: WO 2018/135421 A1

SUMMARY OF INVENTION

Technical Problem

However, although the contact lenses according to Patent Literatures 2 to 4 are good in terms of hydrophilicity and oxygen permeability of the lens surface, there is no description about breaking elongation, and there is room for improvement.

An object of the present invention is to provide a contact lens that can exhibit excellent breaking elongation and surface hydrophilicity even when produced using a hydrophobic mold made of polypropylene or the like without performing a surface hydrophilic treatment. Note that "exhibiting excellent breaking elongation" means that the breaking elongation is 200% or more in mechanical strength measurement described in detail in examples. Furthermore, "exhibiting excellent surface hydrophilicity" means that time is 15 seconds or more in evaluation of WBUT (water film break up time) described in detail in examples.

Another object of the present invention is to provide a monomer composition and a polymer that can be suitably used for obtaining the above contact lens.

A further object of the present invention is to provide a production method for obtaining a contact lens using the above polymer.

Solution to Problem

As a result of diligent research to solve the above problems, the present inventors have found that the above object can be achieved by using a monomer composition containing a specific monomer component in a specific ratio, so as to complete the present invention.

According to one embodiment of the present invention, provided is a monomer composition for contact lenses containing (A) a siloxanyl group-containing itaconic acid diester monomer represented by the following formula (1), (B) one or more amide group-containing monomers selected from the group consisting of N-vinylpyrrolidone, N-vinyl-N-methylacetamide, and N-vinylacetamide, (C) one or more hydroxy group-containing monomers selected from the group consisting of hydroxyethyl (meth)acrylate, hydroxypropyl (meth)acrylate, hydroxybutyl (meth)acrylate, hydroxyethyl acrylamide, ethylene glycol monovinyl ether, and diethylene glycol monovinyl ether, (D) a siloxanyl group-containing (meth)acrylate represented by the following formula (2), and (E) a cross-linking agent, and in this monomer composition, with respect to 100% by mass of a total of the components (A) to (E) in the composition, a content ratio of the component (A) is 5 to 60% by mass, a content ratio of the component (B) is 10 to 60% by mass, a content ratio of the component (C) is 5 to 45% by mass, a content ratio of the component (D) is 5 to 35% by mass, and a content ratio of the component (E) is 0.1 to 15% by mass.

[CHEM. 1]

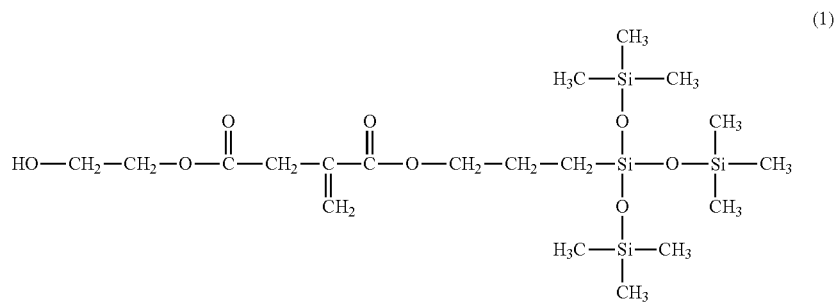

(1)

[CHEM. 2]

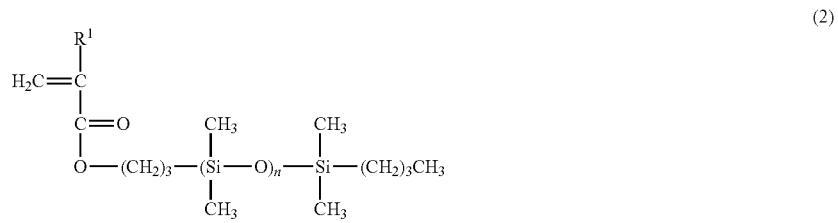

(2)

In formula (2), $R^1$ is a hydrogen atom or a methyl group, and n is 10 to 20.

According to another embodiment of the present invention, there is provided a polymer for contact lenses which is a polymer of the above monomer composition for contact lenses.

According to a further embodiment of the present invention, there are provided a contact lens containing a hydrate of the polymer for contact lenses, and a method of producing the contact lens.

Advantageous Effects of Invention

The monomer composition for contact lenses of the present invention contains components (A) to (E) as essential components in a specific ratio. Thus, the contact lens of the present invention obtained by using a polymer of the composition can exhibit excellent surface hydrophilicity and breaking elongation. In the present invention, even when a contact lens is produced using a hydrophobic mold made of polypropylene or the like without performing a surface hydrophilic treatment, the contact lens can exhibit the above-mentioned excellent characteristics.

DESCRIPTION OF EMBODIMENTS

A monomer composition for contact lenses of the present invention is a uniform liquid that contains components (A) to (E) described later as essential components, and can further contain one or more of components (F) to (G) described later as optional components. A polymer for contact lenses of the present invention includes a polymer of the monomer composition for contact lenses, and the contact lens of the present invention contains a hydrate of the polymer for contact lenses. Hereinafter, the monomer composition for contact lenses of the present invention is simply referred to as a composition. The polymer for contact lenses of the present invention is simply referred to as a polymer.

Component (A): siloxanyl group-containing itaconic acid diester monomer

The component (A) is a siloxanyl group-containing itaconic acid diester monomer represented by the following formula (1). The component (A) contributes to improvement of oxygen permeability and transparency of contact lenses.

[CHEM. 3]

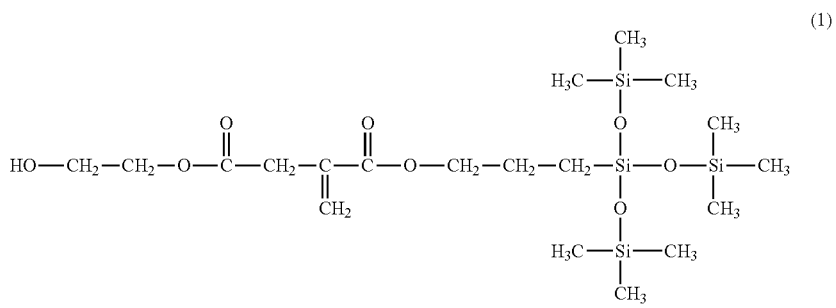

In a process of preparing a monomer represented by the formula (1), a small amount of a structural isomer represented by the following formula (1') may be produced as a by-product. In the present invention, a mixture of the monomer of the formula (1) and a small amount of the monomer of the formula (1') may be used as the component (A). That is, in the present invention, the "siloxanyl group-containing itaconic acid diester monomer represented by the formula (1)" includes not only the monomer of the formula (1) but also includes those containing some isomers of the formula (1') other than the monomer of the formula (1).

[CHEM. 4]

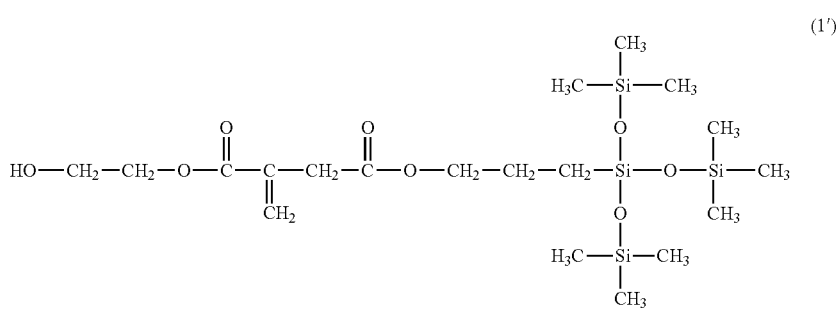

In the composition of the present invention, when a total of the components (A) to (E) is 100% by mass, a content ratio of the component (A) is 5 to 60% by mass, preferably 10 to 50% by mass. If the content ratio of the component (A) is less than 5% by mass, there is a concern that a contact lens to be produced may become cloudy. On the other hand, if the content ratio of the component (A) exceeds 60% by mass, surface hydrophilicity of the contact lens may be insufficient.

Component (B): amide group-containing monomer

The component (B) is one or more amide group-containing monomers selected from the group consisting of N-vinylpyrrolidone, N-vinyl-N-methylacetamide, and N-vinylacetamide. By containing a predetermined amount of the component (B), the surface hydrophilicity of the contact lens can be improved, and the breaking elongation of the contact lens can be improved.

In the composition of the present invention, when the total of the components (A) to (E) is 100% by mass, a content ratio of the component (B) is 10 to 60% by mass, preferably 20 to 50% by mass. If the content ratio of the component (B) is less than 10% by mass, the surface hydrophilicity of the contact lens to be produced may be insufficient. On the other hand, if the content ratio of the component (B) exceeds 60% by mass, there is a concern that the breaking elongation may deteriorate and the contact lens may become cloudy.

Component (C): Hydroxy Group-Containing Monomer

The component (C) is one or more hydroxy group-containing monomers selected from the group consisting of hydroxyethyl (meth)acrylate, hydroxypropyl (meth)acrylate, hydroxybutyl (meth)acrylate, hydroxyethyl acrylamide, ethylene glycol monovinyl ether, and diethylene glycol monovinyl ether. By containing a predetermined amount of the component (C), the surface hydrophilicity of the contact lens is improved. Note that the term "(meth)acrylate" means "acrylate and/or methacrylate", and the term "(meth)acrylic" means "acrylic and/or methacrylic" in the present description.

Specific examples of the component (C) include 2-hydroxyethyl acrylate, 2-hydroxyethyl methacrylate, 2-hydroxypropyl (meth)acrylate, 2-hydroxybutyl (meth)acrylate, 4-hydroxybutyl (meth)acrylate, polyethylene glycol monomethacrylate, N-(2-hydroxyethyl)acrylamide, N-methyl-N-(2-hydroxyethyl)acrylamide, ethylene glycol monovinyl ether, diethylene glycol monovinyl ether, and tetramethylene glycol monovinyl ether. The component (C) may be any one of these monomers, or a mixture of two or more thereof.

In the composition of the present invention, when the total of the components (A) to (E) is 100% by mass, a content ratio of the component (C) is 5 to 45% by mass, preferably 10 to 40% by mass. If the content ratio of the component (C) is less than 5% by mass, the surface hydrophilicity and mechanical strength of the contact lens may be insufficient. On the other hand, if the content ratio of the component (C) exceeds 45% by mass, there is a concern that a modulus may become high and a wearing feeling may deteriorate.

In the composition of the present invention, a mass ratio of the component (B) and the component (C) [component (C)/component (B)] is preferably 0.1 to 3, more preferably 0.1 to 2. By setting the mass ratio to 0.1 or more, it is possible to prevent the contact lens to be produced from becoming cloudy. On the other hand, by setting the mass ratio to 3 or less, deterioration of mechanical strength and breaking elongation can be prevented.

Component (D): Siloxanyl Group-Containing (Meth)Acrylate

The component (D) is a siloxanyl group-containing (meth)acrylate represented by the following formula (2). The component (D) contributes to adjustment of the mechanical strength of the contact lens. The component (D) can be prepared by, for example, the method disclosed in Japanese Unexamined Patent Publication No. 2014-031338, or may be a commercially available product.

[CHEM. 5]

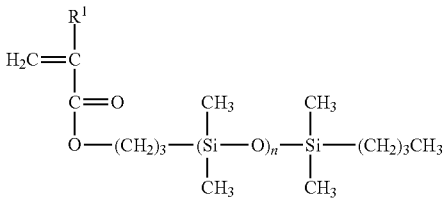

(2)

In formula (2), $R^1$ is a hydrogen atom or a methyl group. n represents the number of repetitions of a dimethylsiloxane portion, which is 10 to 20.

The component (D) may be a mixture of a plurality of compounds having different repetition numbers n. In this case, n is an average value in a number average molecular weight and is in the range of 10 to 20. If n is less than 10, the oxygen permeability decreases, which is not preferable. When n is larger than 20, it is not preferable because the surface hydrophilicity and mechanical strength of the contact lens are lowered.

In the composition of the present invention, when the total of the components (A) to (E) is 100% by mass, a content ratio of the component (D) is 5 to 35% by mass, preferably 5 to 30% by mass. If the content ratio of the component (D) is less than 5% by mass, the mechanical strength of the contact lens becomes too large, and there is a concern that the wearing feeling is not excellent. On the other hand, if the content ratio of the component (D) exceeds 35% by mass, the surface hydrophilicity and mechanical strength of the contact lens may be insufficient.

Component (E): Cross-Linking Agent

The component (E) is a cross-linking agent having two or more polymerizable unsaturated groups and capable of cross-linking monomers of the components (A) to (D). Since the composition of the present invention contains a predetermined amount of the component (E), the polymer of the present invention has a crosslinked structure, and therefore the contact lens of the present invention exhibits excellent solvent resistance.

Specific examples of the component (E) include silicone dimethacrylate represented by the following formula (3), ethylene glycol divinyl ether, diethylene glycol divinyl ether, triethylene glycol divinyl ether, methylenebisacrylamide, alkylene glycol di(meth)acrylate (the alkylene has a carbon number of 2 to 6), polyalkylene glycol di(meth)acrylate (the alkylene has a carbon number of 2 to 4), divinyl sulfone, divinyl benzene, trivinyl benzene, trimethylol propane tri(meth)acrylate, pentaerythritol tetra(meth)acrylate, pentaerythritol tri(meth)acrylate, allyl methacrylate, (2-allyloxy) ethyl methacrylate, 2-(2-vinyloxyethoxy)ethyl acrylate, and 2-(2-vinyloxyethoxy)ethyl methacrylate. Among these, silicone dimethacrylate represented by the following formula (3), triethylene glycol divinyl ether, and tetraethylene glycol di(meth)acrylate are particularly preferable. The component (E) may be any one of these cross-linking agents, or a mixture of two or more thereof.

[CHEM. 6]

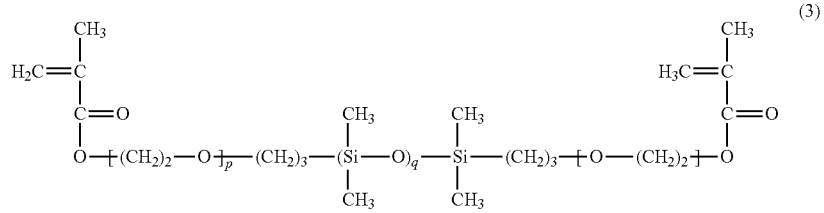

(3)

In the formula (3), p and r are the same and are 0 or 1. q represents the number of repetitions of the dimethylsiloxane portion, which is 10 to 70. The silicone dimethacrylate represented by the formula (3) may be a mixture of a plurality of compounds having different repetition numbers q. In this case, q is an average value in the number average molecular weight and is in the range of 10 to 70 in terms of availability.

In the composition of the present invention, when the total of the components (A) to (E) is 100% by mass, a content ratio of the component (E) is 0.1 to 15% by mass, preferably 0.1 to 10% by mass. If the content ratio of the component (E) is less than 0.1% by mass, solvent resistance of the polymer is lowered, and the polymer may be damaged during cleaning. On the other hand, if the content ratio of the component (E) exceeds 15% by mass, there is a concern that the contact lens may be brittle and may be damaged, and the mechanical strength may become too high to deteriorate the wearing feeling.

Component (F): Monomer Other than Components (A) to (E)

The component (F) is a monomer other than the components (A) to (E). The component (F) is an optional component and is used for the purpose of, for example, adjusting a water content of the contact lens.

Specific examples of the component (F) include (meth)acrylic acid, 2-methacryloyloxyethyl succinic acid, alkyl (meth)acrylates such as methyl (meth)acrylate, ethyl (meth)acrylate and butyl (meth)acrylate, methoxypolyethylene glycol methacrylate, and (2-methacryloyloxyethyl) phosphorylcholine. The component (F) may be any one of these monomers, or a mixture of two or more thereof. That is, the component (F) may be one or more monomers selected from these monomer groups.

When the composition of the present invention contains the component (F), a content ratio of the component (F) is 30 parts by mass or less with respect to 100 parts by mass of the total amount of the components (A) to (E). When the content ratio of the component (F) is 30 parts by mass or less, solubility of the component (A) in the composition is good, and it becomes easy to keep the breaking elongation of the contact lens at equal to or more than a certain level.

Component (G): Solvent Having Hydroxyl Group

The component (G) is a solvent having a hydroxyl group. The component (G) may be alcohols or carboxylic acids, and specific examples thereof include methanol, ethanol, 1-propanol, 2-propanol, 1-butanol, 2-butanol, tert-butanol, 1-pentanol, 2-pentanol, tert-amyl alcohol, 1-hexanol, 1-octanol, 1-decanol, 1-dodecanol, glycolic acid, lactic acid, and acetic acid. The component (G) may be any one of these solvents, or a mixture of two or more thereof. In terms of availability and pH stability, the component (G) is preferably one or more selected from ethanol, 1-propanol, 2-propanol, and 1-hexanol.

In the case where the composition of the present invention contains the component (G), when the total of the components (A) to (E) in the composition is 100 parts by mass, a content ratio of the component (G) is preferably 30 parts by mass or less, more preferably 20 parts by mass or less. If the content ratio of the component (G) is 30 parts by mass or less, the mechanical strength and shape of the contact lens can be maintained in a well-balanced manner.

In addition to the above components (A) to (G), the composition of the present invention may contain components used in the contact lens, such as ultraviolet absorbers and dyes, as long as the object of the present invention is not impaired. Usually, although the content ratio of other components in the composition depends on the thickness of the contact lens, etc., the content ratio of each component is preferably 5 parts by mass or less, more preferably 0.02 to 3 parts by mass, with respect to 100 parts by mass of the total amount of the components (A) to (E) in the composition. If the content ratio exceeds 5 parts by mass, the mechanical strength and safety of the contact lens may decrease.

The composition of the present invention can be produced by, for example, putting the respective components into a stirring (mixing) device in any order or collectively, and stirring (mixing) the components at a temperature of 10° C. to 50° C. until uniform.

The polymer of the present invention includes the polymer of the composition of the present invention. Hereinafter, a method of producing the polymer of the present invention will be described. The production method shown below is only one embodiment of a method for obtaining the polymer, and the polymer of the present invention is not limited to that obtained by the production method.

The polymer of the present invention can be produced by filling a mold with the composition of the present invention and carrying out a polymerization reaction. As the mold, a mold having a hydrophobic surface made of polypropylene or the like is preferable. When carrying out the polymerization reaction, it is preferable to add a polymerization initiator to the composition. In this case, the polymerization can be efficiently carried out by thermal polymerization, photopolymerization or the like.

The polymerization initiator may be a known one, and is preferably a photopolymerization initiator. By using the photopolymerization initiator, photopolymerization can be effectively performed, and productivity and the like can be improved. It is particularly preferable to add the photopolymerization initiator to the composition and photopolymerize the mixture by a method described below.

Specific examples of the photopolymerization initiator include 1-hydroxycyclohexylphenyl ketone, 2-hydroxy-2-methyl-1-phenyl-propan-1-one, bis(2,6-dimethoxybenzoyl)-2,4,4-trimethylpentylphosphine oxide (DMBAPO), bis(2,4,6-trimethylbenzoyl)-phenylphosphine oxide (Irgacure 819), 2,4,6-trimethylbenzyldiphenylphosphine oxide, 2,4,6-trimethylbenzoyldiphenylphosphine oxide, benzoin methyl ester, camphorquinone, and ethyl-4-(N, N-dimethylamino) benzoate. Examples of photopolymerization initiators available on the market include Irgacure 819 (1-819), Irgacure 1700, Irgacure 1800, Irgacure 819, Irgacure 1850, Darocur 1173 (D-1173), and Darocur 2959. The composition of the present invention may contain such a polymerization initiator alone, or may contain two or more kinds of such polymerization initiators.

An amount of the polymerization initiator to be added is preferably 0.1 to 3 parts by mass, more preferably 0.1 to 2 parts by mass, with respect to 100 parts by mass of the total amount of the components (A) to (E) in the composition of the present invention. If the amount of the polymerization initiator is 0.1 to 3 parts by mass, a contact lens having a high polymerization rate and satisfactory physical characteristics can be obtained.

The polymerization reaction can be carried out by irradiating the composition with visible light or UV light for a predetermined time.

Although the polymerization reaction may be carried out in the atmosphere, for the purpose of improving the polymerization rate of the monomer, the polymerization reaction may be carried out in an atmosphere of an inert gas such as nitrogen or argon. When the polymerization is carried out in the inert gas atmosphere, a pressure in a polymerization system is preferably 1 kgf/cm$^2$ or less.

After the polymerization, the polymer can be taken out in a dry state by deforming the mold. The polymer may also be immersed in a solvent (for example, water, methanol, ethanol, 1-propanol, 2-propanol, a mixture thereof, etc.) together with the mold to swell only the polymer, and thus to naturally remove the polymer from the mold. It is preferable to take out the polymer in the dry state without using a solvent.

The contact lens of the present invention is a silicone hydrogel contact lens containing the hydrate of the polymer. That is, the contact lens of the present invention can be obtained by hydrating the polymer of the present invention to form a hydrogel.

Next, a method of producing a contact lens of the present invention will be described. The production method shown below is only one embodiment of a method for obtaining the contact lens of the present invention, and the contact lens of the present invention is not limited to that obtained by the production method.

After the polymerization reaction, the polymer may be in a state of a mixture with an unreacted monomer component (unreacted substance), a residue of each component, a by-product, a residual solvent and the like. Although such a mixture can be subjected to a hydration treatment as it is, it is preferable to wash the polymer with a solvent before the hydration treatment.

Examples of the solvent used for washing include water, methanol, ethanol, 1-propanol, 2-propanol, and a mixture thereof. The washing can be carried out, for example, by immersing the polymer in an alcohol solvent at a temperature of 10° C. to 40° C. for 10 minutes to 5 hours. After washing with alcohol, the polymer may also be washed by being immersed in hydrous alcohol having an alcohol concentration of 20 to 50% by mass for 10 minutes to 5 hours, and further washed with water. As the water, pure water, ion-exchanged water and the like are preferable.

The contact lens of the present invention can be obtained by immersing the washed polymer in normal saline solution and hydrating the polymer to a predetermined water content. The normal saline solution may be boric acid buffered saline, phosphate buffered saline, or the like. The polymer may also be immersed in a preservative solution for soft contact lenses containing normal saline solution.

The contact lens of the present invention has high surface hydrophilicity and oxygen permeability, stains such as lipids are hard to adhere to the contact lens, if adhered, the stains are easily removed by washing, and the contact lens has proper mechanical strength and excellent wearing feeling. Therefore, the contact lens can be used for about one month in a normal usage pattern. That is, the contact lens of the present invention may be replaced at a maximum period of one month. Of course, the contact lens may be replaced in a shorter period of time.

EXAMPLE

Hereinafter, the present invention will be described in more detail with reference to Examples and Comparative Examples, but the present invention is not limited thereto. First, each component used in Examples and Comparative Examples is shown below.

Component (A): Siloxanyl Group-Containing Itaconic Acid Diester Monomer
 ETS: Compound of the formula (1) which is an esterification reaction product of itaconic acid monoethylene glycol ester and 3-iodopropyl [tris(trimethylsiloxy)] silane.
Component (B): amide group-containing monomer
 NVP: N-Vinylpyrrolidone
 MVA: N-vinyl-N-methylacetamide
 VA: N-vinylacetamide
Component (C): hydroxy group-containing monomer
 HEA: 2-Hydroxyethyl acrylate
 HEAA: N-(2-hydroxyethyl)acrylamide
 HEMA: 2-Hydroxyethyl methacrylate
 HPMA: 2-Hydroxypropyl methacrylate
 HBMA: 2-Hydroxybutyl methacrylate
 EMVE: Ethylene glycol monovinyl ether
 DEMVE: Diethylene glycol monovinyl ether
Component (D): siloxanyl group-containing methacrylate
 FM-0711: Compound represented by the formula (2) (R'=methyl group, n=about 11, number average molecular weight Mn=about 1,000)
Component (E): cross-linking agent
 TEGDV: Triethylene glycol divinyl ether
 TEGDMA: Tetraethylene glycol dimethacrylate
 FM-7711: Compound represented by the formula (3) (p=r=0, number average molecular weight Mn=about 1,000)
Component (F): monomer other than components (A) to (E)
 MMA: Methyl methacrylate
Component (G): Solvent
 NPA: 1-propanol
 HeOH: 1-hexanol
Polymerization initiator
 1-819: Bis(2,4,6-trimethylbenzoyl)-phenylphosphine oxide
 D-1173: 2-Hydroxy-2-methylpropiophenone The following items were evaluated for the compositions, polymers, and contact lenses (model contact lenses) of Examples and Comparative Examples.

[Uniformity and Transparency of Composition]

The composition was placed in a colorless and transparent container and visually evaluated according to the following criteria.

Good: Uniform transparency
Poor: White turbidness or precipitation
[Form of Polymer]
A form of the polymer was visually evaluated according to the following criteria.
Good: Solid
Poor: Liquid (including viscous liquid)
[Transparency of Polymer]
Transparency of the polymer was visually evaluated according to the following criteria.
Good: Transparency
Average: Slight white turbidness
Poor: White turbidness
[Transparency of Contact Lens]
After the polymer was purified, the polymer was immersed in the normal saline solution described in ISO-18369-3 and swollen to obtain a hydrogel as a contact lens (model contact lens), which was visually evaluated according to the following criteria.
Good: Transparency
Average: Slight white turbidness
Poor: White turbidness
[Mechanical Strength and Breaking Elongation of Contact Lens]
Using a BAS-3305 (W) breaking strength analyzer manufactured by Yamaden Co., Ltd., a modulus [MPa] of the model contact lens was measured according to JIS-K7127, and the mechanical strength was evaluated. Specifically, a measurement sample obtained by cutting the model contact lens to a width of 2 mm was used, and a load cell of 200 gf was used to pull the model contact lens at a speed of 1 mm/sec with a distance between clamps of 6 mm, and thus to measure the modulus from initial stress. When the modulus was 0.2 MPa or more and less than 1.0 MPa, the mechanical strength was judged to be good. Furthermore, a distance until the measurement sample broke was measured, and an elongation rate with respect to a sample length of 6 mm was defined as the breaking elongation [%]. When the breaking elongation was 200% or more, the breaking elongation was judged to be good.
[Surface Hydrophilicity (WBUT) of Contact Lens]
The surface hydrophilicity of the contact lens was evaluated by WBUT (water film break up time). Specifically, the contact lens was immersed in an ISO saline solution overnight, after an outer periphery of the contact lens was pinched with tweezers, the contact lens was pulled up from a water surface, and a time from when the contact lens was pulled up from the water surface until a water film on a lens surface broke (water film retention time) was measured. A state in which the water film broke was visually judged. This measurement was performed three times, the average value was calculated, and the evaluation was made according to the following criteria.
Very Good: 20 seconds or more
Good: 15 seconds or more and less than 20 seconds
Average: 5 seconds or more and less than 15 seconds
Poor: 0 second or more and less than 5 seconds
[Water Content of Contact Lens]
The water content was measured by the method described in ISO-18369-4.

Example 1

1.96 g (19.6% by mass) of ETS, 2.45 g (24.5% by mass) of NVP, 2.45 g (24.5% by mass) of HEMA, 0.98 g (9.8% by mass) of EMVE, 1.96 g (19.6% by mass) of FM-0711, 0.10 g (1.0% by mass) of TEGDV, 0.10 g (1.0% by mass) of TEGDMA, 0.98 g (9.8 parts by mass) of MMA, and 0.98 g (9.8 parts by mass) of HeOH were mixed and uniformly dissolved to obtain a composition. The above-mentioned evaluation of this composition was performed. Table 1 shows the content ratio of each component and the evaluation results.

0.12 g (1.2 parts by mass) of 1-819 was added to the above composition, and the composition added 1-819 was poured into a cell of 25 mm×70 mm×0.2 mm in which a 0.1-mm-thick polyethylene terephthalate sheet as a spacer was sandwiched between two polypropylene plates, and the cell was placed in a UV irradiation device (manufactured by CCS Inc.). The composition was polymerized by being irradiated with UV light of 405 nm and 1.5 mW/cm$^2$ for 40 minutes in the UV irradiation device to obtain a polymer. The polymer was taken out of the cell and subjected to the above-mentioned evaluation. The polymerization conditions and evaluation results are shown in Table 1.

The polymer was immersed in 40 g of 2-propanol for 4 hours and then immersed in 50 g of ion-exchanged water for 4 hours to remove unreacted substances and the like for purification. The purified polymer was immersed in the normal saline solution described in ISO-18369-3 and swollen (hydrated) to prepare a hydrate. This hydrate was processed into a shape suitable for each evaluation test to obtain a contact lens sample. The results of each evaluation are shown in Table 1. From the evaluation results, it was confirmed that the contact lens of Example 1 had good breaking elongation and high surface hydrophilicity.

Examples 2 to 4

The compositions, polymers, and contact lenses of Examples 2 to 4 were prepared and each evaluation test was carried out in the same manner as in Example 1 except that the content ratio of each component was changed as shown in Table 1. The results are shown in Table 1.

Examples 5 to 9

The compositions, polymers, and contact lenses of Examples 5 to 9 were prepared and each evaluation test was carried out in the same manner as in Example 1 except that the content ratio of each component, the polymerization initiator, and the wavelength of UV irradiation were changed as shown in Table 2. The results are shown in Table 2. From the evaluation results, it was confirmed that the contact lenses of Examples 5 to 9 had good breaking elongation and high surface hydrophilicity.

Comparative Examples 1 to 4

The compositions, polymers, and contact lenses of Comparative Examples 1 to 4 were prepared and each evaluation test was carried out in the same manner as in Example 1 except that in Comparative Examples 1 and 2, the content ratio of each component was changed as shown in Table 3, and in Comparative Examples 3 and 4, the content ratio of each component and the polymerization initiator were changed as shown in Table 3. The results are shown in Table 3.

As is clear from Table 3, the surface hydrophilicity of the contact lenses in Comparative Examples 1 to 3 was extremely inferior to that of each Example. Furthermore, comparative Examples 1 and 2 were inferior in the transparency of the contact lens, and Comparative Example 2 was extremely inferior in the breaking elongation. Comparative Example 4 was extremely inferior to Examples in terms of the transparency and breaking elongation of the contact lens.

TABLE 1

|  |  |  |  | Example 1 | Example 2 | Example 3 | Example 4 |
|---|---|---|---|---|---|---|---|
| Compositions | Monomer component*[1] (mass %) | A | ETS | 19.6 | 58.5 | 19.5 | 19.5 |
|  |  | B | NVP | 24.5 | — | 19.5 | 9.8 |
|  |  |  | MVA | — | 14.6 | — | — |
|  |  |  | VA | — | — | — | 19.5 |
|  |  | C | HEA | — | — | — | — |
|  |  |  | HEAA | — | — | — | — |
|  |  |  | HEMA | 24.5 | 14.6 | — | 19.5 |
|  |  |  | HPMA | — | — | 19.5 | — |
|  |  |  | HBMA | — | — | — | — |
|  |  |  | EMVE | 9.8 | — | — | 9.7 |
|  |  |  | DEMVE | — | — | 19.5 | — |
|  |  | D | FM-0711 | 19.6 | 9.8 | 19.5 | 19.5 |
|  |  | E | TEGDV | 1.0 | 1.5 | 1.5 | 1.5 |
|  |  |  | TEGDMA | 1.0 | 1.0 | 1.0 | 1.0 |
|  |  |  | FM-7711 | — | — | — | — |
|  | Total of components A to E (mass %) |  |  | 100.0 | 100.0 | 100.0 | 100.0 |
|  | Other component*[2] (part(s) by mass) | F | MMA | 9.8 | — | — | — |
|  |  | G | NPA | — | 9.8 | — | — |
|  |  |  | HeOH | 9.8 | — | 9.8 | 9.8 |
| Polymerization initiator (part(s) by mass) *[3] |  |  | I-819 | 1.2 | 1.0 | 1.0 | 1.0 |
|  |  |  | D-1173 | — | — | — | — |
| Polymerization condition |  | Wavelength (nm) |  | 405 | 405 | 405 | 405 |
|  |  | Illuminance (mW/cm$^2$) |  | 1.5 | 1.5 | 1.5 | 1.5 |
|  |  | Time (min) |  | 40 | 40 | 40 | 40 |
| Evaluation | Uniform transparency of composition |  |  | Good | Good | Good | Good |
|  | Form of polymer |  |  | Good | Good | Good | Good |
|  | Transparency of polymer |  |  | Good | Good | Good | Good |
|  | Transparency of CL*[4] |  |  | Good | Good | Good | Good |
|  | Mechanical strength of CL (MPa) |  |  | 0.4 | 0.7 | 0.6 | 0.3 |
|  | Breaking elongation of CL (%) |  |  | 250 | 300 | 270 | 300 |
|  | Surface hydrophilicity of CL |  |  | Very Good | Good | Good | Very Good |
|  | Water content of CL |  |  | 54 | 45 | 50 | 55 |

*[1]Amounts of components A to E contained: based on total amount of components A to E
*[2]Amounts of components F and G contained: with respect to 100 parts by mass of total amount of components A to E
*[3] Amount of polymerization initiator added: with respect to 100 parts by mass of total amount of components A to E
*[4]Contact lens

TABLE 2

|  |  |  |  | Example 5 | Example 6 | Example 7 | Example 8 | Example 9 |
|---|---|---|---|---|---|---|---|---|
| Compositions | Monomer component*[1] (mass %) | A | ETS | 19.3 | 19.3 | 9.7 | 19.6 | 19.6 |
|  |  | B | NVP | 290 | 48.3 | 43.5 | — | 24.5 |
|  |  |  | MVA | — | — | — | 19.6 | — |
|  |  |  | VA | — | — | — | — | — |
|  |  | C | HEA | — | — | — | 34.3 | — |
|  |  |  | HEAA | — | — | — | — | 4.9 |
|  |  |  | HEMA | 19.3 | 9.7 | — | — | 19.6 |
|  |  |  | HPMA | — | — | — | — | — |
|  |  |  | HBMA | — | — | 9.7 | — | — |
|  |  |  | EMVE | 9.8 | — | — | 9.8 | 9.8 |
|  |  |  | DEMVE | — | — | — | — | — |
|  |  | D | FM-0711 | 19.3 | 9.7 | 33.8 | 14.7 | 19.6 |
|  |  | E | TEGDV | 1.9 | 1.9 | 1.9 | 1.0 | 1.0 |
|  |  |  | TEGDMA | 1.4 | 1.4 | 1.4 | 1.0 | 1.0 |
|  |  |  | FM-7711 | — | 9.7 | — | — | — |
|  | Total of components A to E (mass %) |  |  | 100.0 | 100.0 | 100.0 | 100.0 | 100.0 |
|  | Other component*[2] (part(s) by mass) | F | MMA | 9.7 | — | 9.7 | — | 9.8 |
|  |  | G | NPA | — | — | — | — | — |
|  |  |  | HeOH | 9.7 | 14.5 | 14.5 | 14.7 | 9.8 |
| Polymerization initiator (part(s) by mass) *[3] |  |  | I-819 | — | — | — | — | — |
|  |  |  | D-1173 | 0.8 | 0.8 | 1.0 | 0.8 | 0.8 |
| Polymerization condition |  | Wave length (nm) |  | 365 | 365 | 365 | 365 | 365 |
|  |  | Illuminance (mW/cm$^2$) |  | 1.5 | 1.5 | 1.5 | 1.5 | 1.5 |
|  |  | Time (min) |  | 40 | 40 | 40 | 40 | 40 |
| Evaluation | Uniform transparency of composition |  |  | Good | Good | Good | Good | Good |
|  | Form of polymer |  |  | Good | Good | Good | Good | Good |

TABLE 2-continued

|  | Example 5 | Example 6 | Example 7 | Example 8 | Example 9 |
|---|---|---|---|---|---|
| Transparency of polymer | Good | Good | Good | Good | Good |
| Transparency of CL[*4] | Good | Good | Good | Good | Good |
| Mechanical strength of CL (MPa) | 0.4 | 0.8 | 0.4 | 0.5 | 0.3 |
| Braking elongation of CL (%) | 290 | 250 | 350 | 200 | 250 |
| Surface hydrophilicity of CL | Very Good | Good | Good | Good | Very Good |
| Water content of CL | 53 | 45 | 57 | 50 | 56 |

[*1]Amounts of components A to E contained: based on total amount of components A to E
[*2]Amounts of components F and G contained: with respect to 100 parts by mass of total amount of components A to E
[*3] Amount of polymerization initiator added: with respect to 100 parts by mass of total amount of components A to E
[*4]Contact lens

TABLE 3

| | | | | Comparative Example 1 | Comparative Example 2 | Comparative Example 3 | Comparative Example 4 |
|---|---|---|---|---|---|---|---|
| Compositions | Monomer component[*1] (mass %) | A | ETS | 19.6 | 19.6 | 14.7 | 14.5 |
| | | B | NVP | 4.9 | — | 19.6 | 62.8 |
| | | | MVA | — | — | 9.8 | — |
| | | | VA | — | — | — | — |
| | | C | HEA | — | 39.2 | — | — |
| | | | HEAA | — | — | — | — |
| | | | HEMA | 53.9 | — | 14.7 | 9.7 |
| | | | HPMA | — | — | — | — |
| | | | HBMA | — | — | — | — |
| | | | EMVE | — | 19.6 | — | — |
| | | | DEMVE | — | — | — | — |
| | | D | FM-0711 | 19.6 | 19.6 | 39.2 | 9.7 |
| | | E | TEGDV | 1.0 | 1.0 | 1.0 | 1.9 |
| | | | TEGDMA | 1.0 | 1.0 | 1.0 | 1.4 |
| | | | FM-7711 | — | — | — | — |
| | Total of components A to E (mass %) | | | 100.0 | 100.0 | 100.0 | 100.0 |
| | Other component[*2] (part(s) by mass) | F | MMA | — | 9.8 | — | — |
| | | G | NPA | — | — | — | — |
| | | | HeOH | 9.8 | 9.8 | 9.8 | 9.7 |
| Polymerization initiator (part(s) by mass)[*3] | | | I-819 | 1.0 | 1.0 | — | — |
| | | | D-1173 | — | — | 1.0 | 0.8 |
| Polymerization condition | | | Wavelength (nm) | 405 | 405 | 365 | 365 |
| | | | Illuminance (mW/cm$^2$) | 1.5 | 1.5 | 1.5 | 1.5 |
| | | | Time (min) | 40 | 40 | 40 | 40 |
| Evaluation | Uniform transparency of composition | | | Good | Good | Good | Good |
| | Form of polymer | | | Good | Good | Good | Good |
| | Transparency of polymer | | | Good | Good | Good | Good |
| | Transparency of CL[*4] | | | Average | Average | Good | Poor |
| | Mechanical strength of CL (MPa) | | | 1.2 | 1.5 | 0.3 | 0.2 |
| | Breaking elongation of CL (%) | | | 200 | 120 | 250 | 120 |
| | Surface hydrophilicity of CL | | | Poor | Poor | Average | Good |
| | Water content of CL | | | 42 | 40 | 48 | 60 |

[*1]Amounts of components A to E contained: based on total amount of components A to E
[*2]Amounts of components F and G contained: with respect to 100 parts by mass of total amount of components A to E
[*3]Amount of polymerization initiator added: with respect to 100 parts by mass of total amount of components A to E
[*4]Contact lens

What is claimed is:

1. A monomer composition for contact lenses consisting of:
   (A) a siloxanyl group-containing itaconic acid diester monomer of the following formula (1):

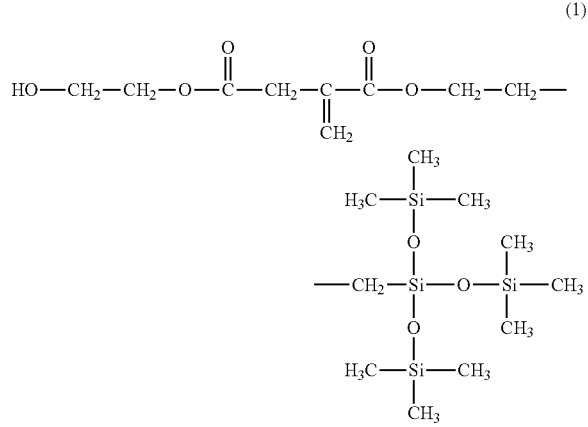

(B) one or more amide group-containing monomers selected from the group consisting of N-vinylpyrrolidone, N-vinyl-N-methylacetamide, and N-vinylacetamide;
   (C) one or more hydroxy group-containing monomers selected from the group consisting of hydroxyethyl (meth)acrylate, hydroxypropyl (meth)acrylate, hydroxybutyl (meth)acrylate, hydroxyethyl acrylamide, ethylene glycol monovinyl ether, and diethylene glycol monovinyl ether;
   (D) a siloxanyl group-containing (meth)acrylate of the following formula (2):

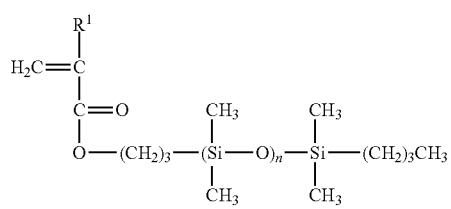

wherein $R^1$ is a hydrogen atom or a methyl group, and n is 10 to 20; and
   (E) a cross-linking agent,
   wherein with respect to 100% by mass of a total of the components (A) to (E) in the composition, a content ratio of the component (A) is 5 to 60% by mass, a content ratio of the component (B) is 10 to 60% by mass, a content ratio of the component (C) is 5 to 45% by mass, a content ratio of the component (D) is 5 to 35% by mass, and a content ratio of the component (E) is 0.1 to 15% by mass.

2. A monomer composition for contact lenses consisting of:
   the monomer composition for contact lenses according to claim 1, and
   (F) one monomer selected from (meth)acrylic acid, 2-methacryloyloxyethyl succinic acid, alkyl (meth) acrylates and methoxypolyethylene glycol methacrylate, or a mixture of two or more thereof,
   wherein a content ratio of the component (F) is 30 parts by mass or less with respect to 100 parts by mass of a total amount of the components (A) to (E) in the composition.

3. A monomer composition for contact lenses consisting of:
   the monomer composition for contact lenses according to claim 1, and
   (G) a solvent having a hydroxyl group,
   wherein a content ratio of the component (G) is 30 parts by mass or less with respect to 100 parts by mass of the total amount of the components (A) to (E) in the composition.

4. A polymer for contact lenses comprising a polymer of the monomer composition for contact lenses according to claim 1.

5. A contact lens comprising a hydrate of the polymer for contact lenses according to claim 4.

6. A method of producing a contact lens, comprising the steps of:
   mixing the polymer for contact lenses according to claim 4 and one or more solvents selected from the group consisting of water, methanol, ethanol, 1-propanol, and 2-propanol and washing the polymer; and
   immersing the polymer in a normal saline solution and hydrating the polymer.

7. A monomer composition for contact lenses consisting of:
   the monomer composition for contact lenses according to claim 2, and
   (G) a solvent having a hydroxyl group,
   wherein a content ratio of the component (G) is 30 parts by mass or less with respect to 100 parts by mass of the total amount of the components (A) to (E) in the composition.

8. A polymer for contact lenses comprising a polymer of the monomer composition for contact lenses according to claim 2.

9. A polymer for contact lenses comprising a polymer of the monomer composition for contact lenses according to claim 3.

10. A contact lens comprising a hydrate of the polymer for contact lenses according to claim 8.

11. A contact lens comprising a hydrate of the polymer for contact lenses according to claim 9.

12. A method of producing a contact lens, comprising the steps of:
    mixing the polymer for contact lenses according to claim 8 and one or more solvents selected from the group consisting of water, methanol, ethanol, 1-propanol, and 2-propanol and washing the polymer; and
    immersing the polymer in a normal saline solution and hydrating the polymer.

13. A method of producing a contact lens, comprising the steps of:
    mixing the polymer for contact lenses according to claim 9 and one or more solvents selected from the group consisting of water, methanol, ethanol, 1-propanol, and 2-propanol and washing the polymer; and
    immersing the polymer in a normal saline solution and hydrating the polymer.

14. A polymer for contact lenses comprising a polymer of the monomer composition for contact lenses according to claim 7.

15. A contact lens comprising a hydrate of the polymer for contact lenses according to claim 14.

16. A method of producing a contact lens, comprising the steps of:
- mixing the polymer for contact lenses according to claim 14 and one or more solvents selected from the group consisting of water, methanol, ethanol, 1-propanol, and 2-propanol and washing the polymer; and
- immersing the polymer in a normal saline solution and hydrating the polymer.

\* \* \* \* \*